United States Patent
Suzuki

(10) Patent No.: US 7,132,938 B2
(45) Date of Patent: Nov. 7, 2006

(54) TIRE PRESSURE WARNING SYSTEM

(75) Inventor: Akira Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 194 days.

(21) Appl. No.: 10/969,068

(22) Filed: Oct. 21, 2004

(65) Prior Publication Data
US 2005/0099281 A1   May 12, 2005

(30) Foreign Application Priority Data
Oct. 24, 2003 (JP) .......................... P2003-364798

(51) Int. Cl.
*B60C 23/00* (2006.01)
(52) U.S. Cl. .................. 340/442; 340/438; 340/439; 340/450.2; 701/123
(58) Field of Classification Search ................ None
See application file for complete search history.

(56) References Cited

U.S. PATENT DOCUMENTS

| | | | | |
|---|---|---|---|---|
| 3,673,863 A | * | 7/1972 | Spacek | 73/114 |
| 5,647,927 A | * | 7/1997 | Mason | 152/415 |
| 5,902,348 A | * | 5/1999 | Okamoto et al. | 701/201 |
| 5,913,917 A | * | 6/1999 | Murphy | 701/123 |
| 6,594,579 B1 | * | 7/2003 | Lowrey et al. | 701/123 |
| 6,722,193 B1 | * | 4/2004 | Conway | 73/146.8 |

FOREIGN PATENT DOCUMENTS

JP    10-512515    12/1998

\* cited by examiner

*Primary Examiner*—Benjamin C. Lee
*Assistant Examiner*—Son Tang
(74) *Attorney, Agent, or Firm*—McGinn IP Law Group, PLLC

(57) ABSTRACT

A tire pressure warning system has an air pressure detecting device 3, a low pressure warning display unit 5 and a fuel consumption deterioration warning display unit 4. The air pressure detecting device 3 detects an air pressure of each tire 2 of a vehicle. The low pressure warning display unit 5 warns an occupant of a reduced air pressure when an air pressure detected by the air pressure detecting device 3 is lower than a running inhibition tire pressure 11 set in advance. The fuel consumption deterioration warning display unit 4 warns the occupant of a deterioration in a fuel consumption when the air pressure is lower than a fuel consumption deteriorating tire pressure 12 which is set higher than the running inhibition tire pressure 11.

4 Claims, 4 Drawing Sheets

TIRE PRESSURE WARNING SYSTEM

This application claims foreign priority based on Japanese patent application No. JP-2003-364798, filed on Oct. 24, 2003, the contents of which is incorporated herein by reference.

BACKGROUND OF THE INVENTION

The present invention relates to a tire pressure warning system for warning an occupant of a vehicle that an air pressure is reduced, in the event that the air pressure of a tire of the vehicle is lower than a predetermined pressure value.

In recent years, in vehicles such as automobiles, the tire pressure warning systems have been widely used. The tire pressure warning systems monitor the air pressure of each tire and warn the occupant of a reduction in air pressure in the event that the air pressure drops remarkably. In the tire pressure warning systems, there are provided sensors for detecting a rotational speed of each wheel on which the tire is mounted, and the air pressure of each tire is calculated by comparing the rotational speeds of the respective wheels so detected according to running conditions of the vehicle.

Then, when the air pressure of at least one of the respective tires becomes lower than a running inhibition tire pressure that is set in advance, the occupant is warned of a reduced air pressure occurring in any one of the tires using an indicator installed in a passenger compartment, whereby the occupant can restore the reduced air pressure to its original pressure value before the normal running eis interfered.

The above tire pressure warning systems are disclosed, for example, in JP-A-10-512515.

Incidentally, it is known that the fuel consumption of the vehicle is largely affected by the air pressure of the tire as a rolling resistance of the vehicle increases, when the air pressure of the tire is reduced. With the aforesaid tire pressure warning system, however, the occupant is warned of only information regarding the running inhibition tire pressure that is required for the normal running of the vehicle. Namely, it will be more convenient if the occupant can be warned of not only an information regarding the normal running of the vehicle but also information regarding the fuel consumption of the vehicle.

SUMMARY OF THE INVENTION

The present invention is made in the light of the situations, and an object thereof is to provide a tire pressure warning system for warning an occupant of an information on a tire air pressure relating to a fuel consumption of a vehicle.

With a view to attaining the object, according to a first aspect of the present invention, there is provided a tire pressure warning system comprising an air pressure detecting unit for detecting an air pressure of each tire, a reduced pressure warning unit for warning an occupant of a reduced air pressure when a detected air pressure is lower than a running inhibition tire pressure set in advance, and a fuel consumption deterioration warning unit for warning the occupant of a deterioration in a fuel consumption when the air pressure is lower than a fuel consumption deteriorating tire pressure set higher than the running inhibition tire pressure.

According to the first aspect of the present invention, the occupant is warned of the deterioration of the fuel consumption by the fuel consumption deterioration warning unit when the air pressure become lower than the fuel consumption deterioration pressure, whereby the occupant can recognize an air pressure reduction and a deterioration of the fuel consumption.

Then, in the event that the air pressure of the tire is further reduced, and the air pressure becomes lower than the running inhibition tire pressure, the occupant can be warned by the reduced pressure warning unit that the air pressure of the tire has been reduced so as to interfere the vehicle running.

Consequently, the occupant can restore the air pressure to the required condition thereof (standard tire pressure value) before the fuel consumption becomes deteriorated, which is effective to prevent the deterioration of the fuel consumption.

In addition, since the fuel consumption deteriorating tire pressure is higher than the running inhibition tire pressure, the occupant or the like can recognize that the air pressure has reduced by being warned of the deterioration in fuel consumption before the detected air pressure has reduced to the running inhibition tire pressure. Namely, in the event that the occupant has failed to manage the air pressure of the tires, so that the air pressure of a certain tire has been reduced naturally, it is normal that the air pressure is recovered when the occupant is warned of the deterioration in fuel consumption, whereby, in reality, the reduction in the air pressure down to the running inhibition tire pressure can be suppressed.

Note that in case the air pressure is reduced drastically due to the blowout (puncture) thereof, the air pressure becomes lower than the running inhibition tire pressure, and the occupant is warned of the reduction in air pressure by the reduced pressure warning unit.

According to a second aspect of the present invention, there is provided the tire pressure warning system as set forth in the first aspect, further comprising a vehicle speed detecting unit for detecting a vehicle speed and a vehicle speed changing unit for changing at least one of the running inhibition tire pressure and the fuel consumption deteriorating tire pressure in accordance with a speed detected by the vehicle speed detecting unit.

According to the second aspect of the present invention, in addition to the function provided by the first aspect, at least one of the running inhibition tire pressure and the fuel consumption deteriorating tire pressure is changed. Here, the tire pressure which interfere the vehicle running and the tire pressure which deteriorates the fuel consumption vary according to the vehicle speed. Consequently, the occupant can be warned precisely of the tire pressure by varying the tire pressure value according to a running condition, for example, whether the vehicle runs at high speeds, runs at low speeds or is stopping.

According to a third aspect of the present invention, there is provided the tire pressure warning system as set forth in the first or second aspect, further comprising a load detecting unit for detecting the load of the tire relative to a road surface and a load changing unit for changing at least one of the running inhibition tire pressure and the fuel consumption deteriorating tire pressure according to a load detected by the load detecting unit.

Note that when used herein, a "tire load rate" means a rate between a current load and a maximum load, and the rate thereof varies according to the running conditions.

According to the third aspect of the present invention, in addition to the function provided by the first or second aspect, at least one of the running inhibition tire pressure and the fuel consumption deteriorating tire pressure is changed according to the load of the tire relative to the surface of a road. Here, the load of the tire relative to the road surface varies according to, for example, the load weight, whereby the tire pressure which interferes the vehicle running and the tire pressure which deteriorates the fuel consumption vary. Consequently, the occupant can be warned precisely of the tire pressure by changing the respective tire pressures according to, for example, the load thereto.

Thus, according to the present invention, the occupant can restore the air pressure of the tire to the required condition (standard tire pressure value) thereof before the fuel consumption becomes deteriorated, which is effective to prevent the deterioration in the fuel consumption.

In addition, even in case the user of the vehicle has failed to control the air pressure over a long period of time, the reduction in air pressure of the tires down to the running inhibition tire pressure can be suppressed.

DESCRIPTION OF THE PREFERRED EMBODIMENT

Figure 1:
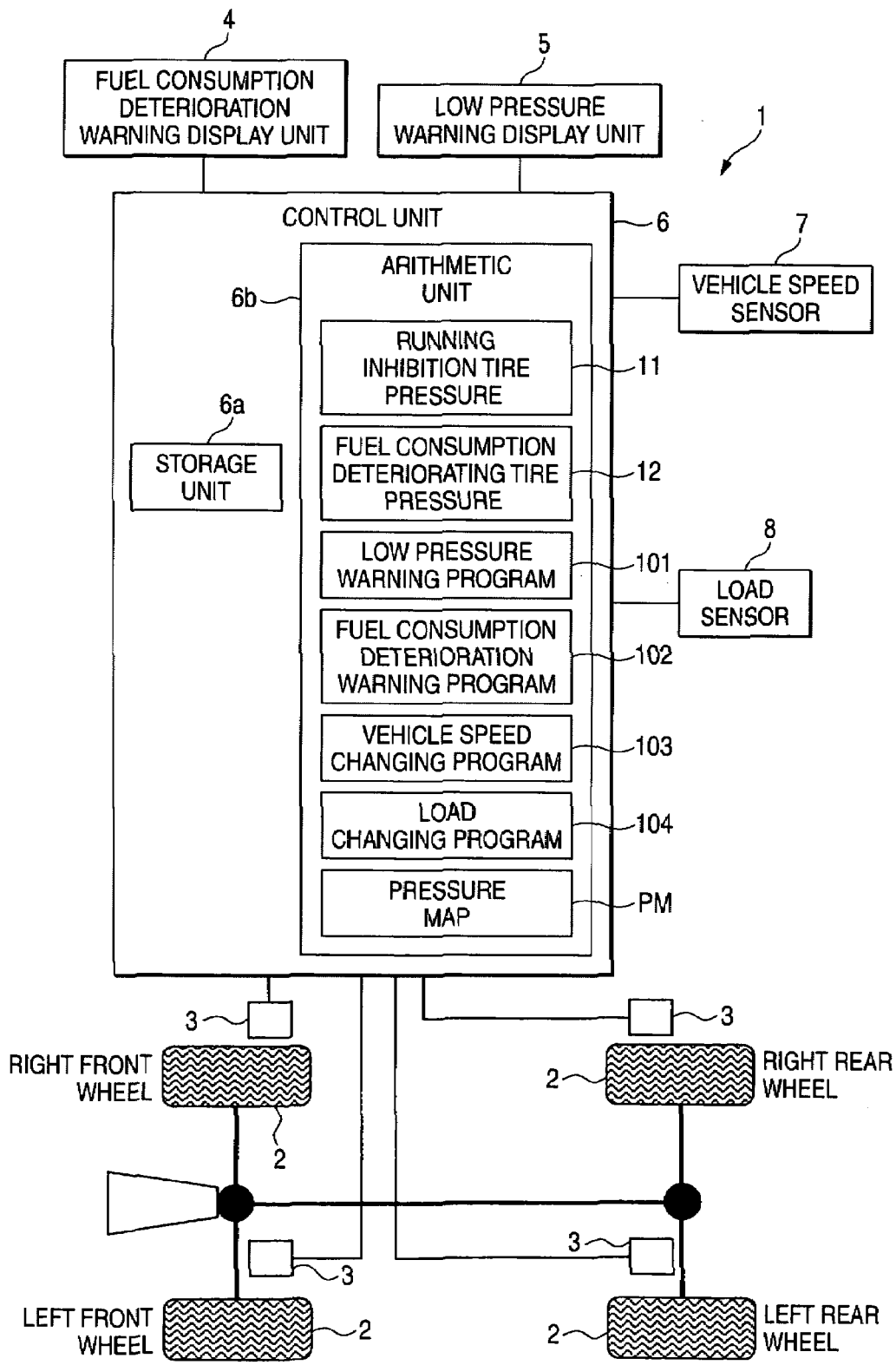
FIG. 1 is a schematic block diagram of a tire pressure warning system.
Figure 2:
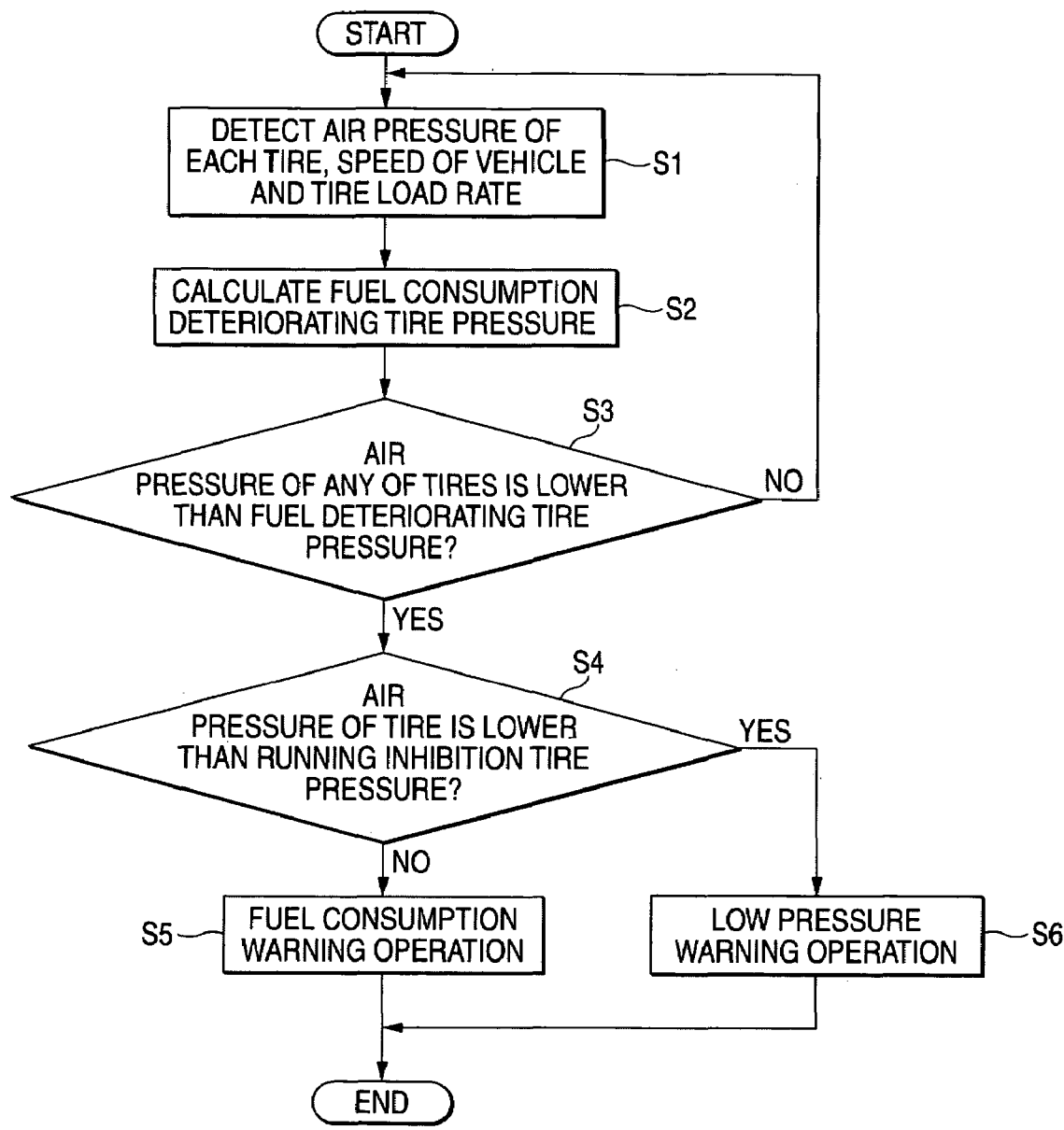
FIG. 2 is a flowchart illustrating operations of a control unit.
Figure 3:
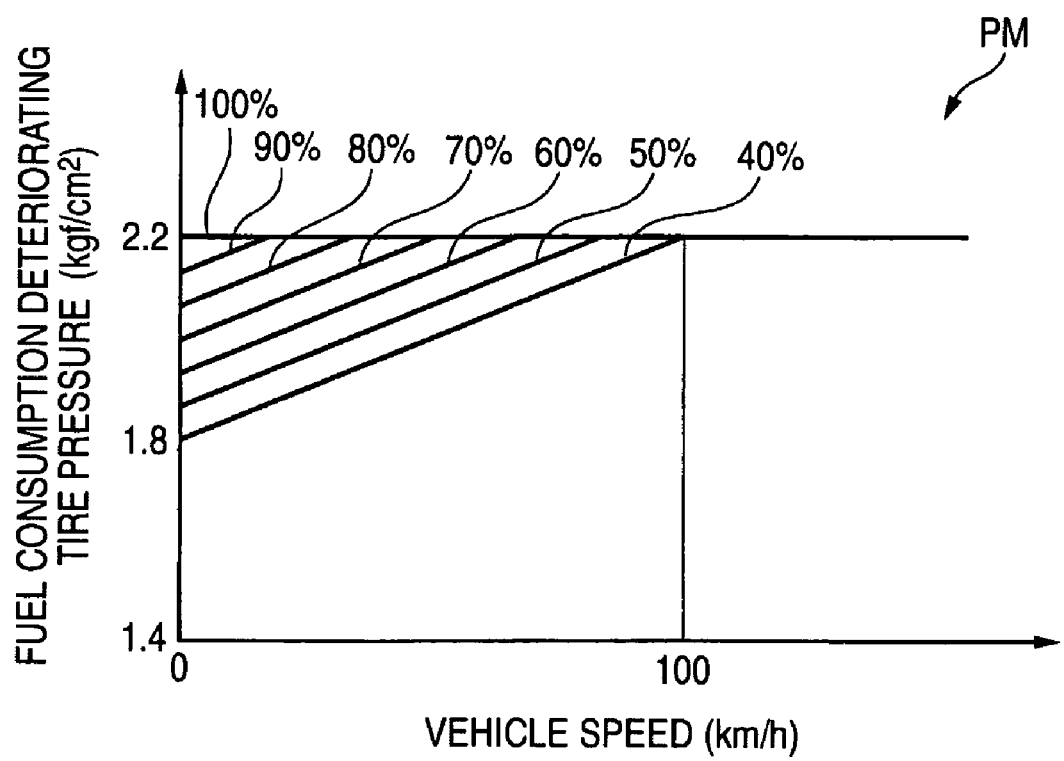
FIG. 3 is a map showing a relationship between a vehicle speed and a tire load rate, and a fuel deteriorating tire pressure.

FIGS. 1 to 3 show an embodiment of the present invention, in which FIG. 1 is a schematic block diagram showing a configuration of a tire pressure warning system, FIG. 2 is a flowchart illustrating operations of a control unit, and FIG. 3 is a map explaining relationships between a vehicle speed and a tire load rate, and fuel consumption deteriorating tire pressure value.

A tire pressure warning system 1 is a system for warning a vehicle occupant of a reduction in an air pressure of each of tires 2 of a vehicle in the event that the air pressure of the tire becomes lower than a predetermined pressure value. As shown in FIG. 1, the tire pressure warning system 1 includes an air pressure detecting device 3 which is disposed on each wheel for detecting the air pressure of each tire. The air pressure detecting device 3 is connected to a fuel consumption deterioration warning display unit 4 as a fuel consumption deterioration warning means, a low pressure warning display unit 5 as a low pressure warning means and a control unit 6. The respective display units 4, 5 may be in the form of, for example, a warning lamp which installed in a meter panel or a display installed in an instrument panel. Furthermore, a vehicle speed sensor 7 as a vehicle speed detecting unit for detecting the vehicle speed and a load sensor 8 as a load detecting unit for detecting the load on the tires are connected to the control unit 6.

Here, each air pressure detecting device 3 as an air detecting unit may be such as to detect the rotational speed of each wheel to send thereof to the control unit 6 for calculating an air pressure for each tire 2 or such as to detect directly the air pressure of each tire 2. In the event that each air pressure detecting device 3 is structured to detect the rotational speed of each wheel to send thereof to the control unit 6 for calculating an air pressure for each tire 2, a program for calculating the air pressure is stored in a storage unit 6a of the control unit 6.

The control unit 6 has the storage unit 6a made up of, for example, an EEPROM, RAM and the like and an arithmetic unit 6b made up of, for example, a CPU. A running inhibition tire pressure 11 and a fuel consumption deteriorating tire pressure 12, which are both set in advance, are stored in the storage unit 6a. The running inhibition tire pressure 11 is a tire pressure value which is likely to interfere the vehicle running, and in this embodiment, the pressure value is determined by the vehicle speed and a tire load rate. Note that when used herein, a "tire load rate" means a rate between a current load and a maximum load (Tire load rate=Current load/Maximum load), and the value varies according to the running conditions of the vehicle. In addition, the fuel consumption deteriorating tire pressure 12 is a tire pressure value at which the deterioration in fuel consumption is anticipated to become remarkable, and the value is determined by the vehicle speed and the tire load rate in the embodiment. The fuel consumption deteriorating tire pressure 12 is set higher than the running inhibition tire pressure 11. To be specific, in the embodiment, the running inhibition tire pressure 11 is set to a pressure value which is lower by 25% than a standard tire pressure value which is determined for each vehicle model type, and the fuel consumption deteriorating tire pressure 12 is set to a pressure value which is lower by 15% than the standard tire pressure value. Note that since whether or not the fuel consumption deteriorates may be determined on the basis of the subjective point of the view of the driver, the fuel consumption deteriorating tire pressure 12 may be such as to be optionally set by the occupant.

In the storage unit 6a, a low pressure warning program 101 is stored. The low pressure warning program 101 is stored for warning the occupant via the low pressure warning display unit 5 that the air pressure of the tire is reduced, when a air pressure detected by each air pressure detecting device 3 is lower than the running inhibition tire pressure 11. In addition, in the storage unit 6a, a fuel consumption deterioration warning program 102 is also stored. The fuel consumption deterioration warning program 102 is stored for warning the occupant via the fuel consumption deterioration warning display unit 4 that the air pressure is reduced, when the air pressure becomes lower than the fuel consumption deteriorating tire pressure 12.

In addition, in the storage unit 6a, a vehicle speed changing program 103 is also stored. The vehicle speed changing program 103 is stored for changing the fuel consumption deteriorating tire pressure 12 according to a speed detected by the vehicle speed sensor 7. In addition, a load changing program 104 is stored therein for changing the fuel consumption deteriorating tire pressure 12 according to a tire load rate detected by the load sensor 8. Namely, in the embodiment, the control unit 6 constitutes the vehicle speed changing unit and the load changing unit. In this embodiment, the vehicle speed changing program 103 and the load changing program 104 change the fuel consumption deteriorating tire pressure 12 based on a pressure value map PM which is set in advance.

As shown in FIG. 3, the pressure map PM is set such that the fuel consumption deteriorating tire pressure value 12 increases as the vehicle speed increases. In this embodiment, the fuel consumption deteriorating tire pressure 12 is designed to change in proportion to the vehicle speed between 0 km/h and 100 km/h such that the consumption deteriorating tire pressure 12 becomes 1.8 kgf/cm² when the vehicle speed is 0 km/h and 2.2 kgf/cm² when the vehicle speed is 100 km/h or larger. Note that in a state where the tire load rate is 100%, the fuel consumption deteriorating tire pressure 12 becomes constant at 2.2 kgf/cm² irrespective of the vehicle speeds.

In addition, as shown in FIG. 3, the pressure value map PM is set such that the fuel consumption deteriorating tire pressure 12 increases as the tire load rate increases. In the embodiment, the fuel consumption deteriorating tire pressure 12 is designed to change in proportion to the tire load rate between 40% to 100% in the state where the vehicle speed is 0 km/h such that the consumption deteriorating tire pressure 12 becomes 1.8 kgf/cm² when the tire load rate is 40% or smaller and 2.2 kgf/cm² when the tire load rate is 100% or larger.

The operation of the control unit 6 of the tire pressure warning system 1, which is structured as has been described heretofore, will be described below by reference to the flowchart shown in FIG. 2.

First, the air pressure of each tire 2, the vehicle speed and the tire load rate are detected (step S1). Then, the fuel consumption deteriorating tire pressure 12 is calculated from the vehicle speed and the tire load rate so detected (step S2).

Following this, a fuel consumption deteriorating tire pressure 12 is compared with the air pressure of each tire 2, and it is determined whether or not the air pressure of any tires 2 is lower than the fuel consumption deteriorating tire pressure 12 (step S3). Here, if the air pressure of the tire 2 is determined to be equal to or larger than the fuel consumption deteriorating tire pressure 12, then, return to the step S1, where the vehicle speed and the tire load rate continue to be monitored. Then, if the air pressure is lower than the fuel consumption deteriorating tire pressure 12, it is determined whether or not the air pressure is lower than the running inhibition tire pressure 11 (step S4).

Here, if the air pressure is determined to be equal to or larger than the running inhibition tire pressure 11, a fuel consumption warning operation is performed by using the fuel consumption deterioration warning display unit 4 (step S5). In contrast, if the air pressure is determined to be lower than the running inhibition tire pressure 11, a low pressure warning operation is performed by using the low pressure warning display unit 5 (step S6).

Thus, according to the tire pressure warning system 1 of the embodiment, when the air pressure reduces to become lower than the fuel consumption deteriorating tire pressure 12, a deterioration warning in the fuel consumption is given to the occupant by the fuel consumption deterioration warning program 102, whereby the occupant can recognize the reduction in the air pressure of any tires as the fuel consumption of the vehicle deteriorates.

Then, in the event that the air pressure of the tire 2 reduces further such that the air pressure becomes lower than the running inhibition tire pressure value 11, a reduction warning in the air pressure is given to the occupant by the low pressure warning program 101, whereby the occupant can recognize that the air pressure has reduced so as to interfere the proper running of the vehicle.

Consequently, the occupant can recover the air pressure of the tire 2 to the required condition thereof (standard tire pressure value) before the fuel consumption gets deteriorated, which is effective to prevent the deterioration of the fuel consumption.

In addition, since the fuel consumption deteriorating tire pressure 12 is higher than the running inhibition tire pressure 11, the occupant or the like can recognize that the air pressure has reduced by being warned of the deterioration in the fuel consumption before the air pressure reduced down to the running inhibition tire pressure 11. Namely, in the event that the vehicle user or the like has failed to mange the air pressure over the long period of time, so that the air pressure reduces naturally, it is normal that the reduced air pressure is restored to the required condition thereof (standard tire pressure value) by warning the vehicle user or the like of the deterioration of the fuel consumption, whereby, in reality, the reduction in tire air pressure down to the running inhibition tire pressure 11 can be suppressed.

Note that in case the air pressure drops drastically due to a blowout or the like, the air pressure becomes lower than the running inhibition tire pressure 11, and the occupant is warned of the reduced air pressure by the reduced pressure warning program 101.

In addition, while the tire pressure value at which the fuel consumption deteriorates varies according to the vehicle speed, according to the tire pressure warning system 1 of the embodiment, since the fuel consumption deteriorating tire pressure 12 is changed according to the vehicle speed, the occupant can be warned precisely of the tire air pressure by the function.

Additionally, while the tire pressure at which the fuel consumption deteriorates varies according to the tire load rate, according to the tire pressure warning system of the embodiment, since the fuel consumption deteriorating tire pressure 12 is changed according to the tire load rate, the occupant can also be warned precisely of the air pressure by this function.

Note that while, in the embodiment, the fuel consumption deteriorating tire pressure 12 is described as being changed according to the vehicle speed, for example, the running inhibition tire pressure 11 may be changed instead, and a precise warning of the air pressure can be implemented if at least one of the running inhibition tire pressure 11 and the fuel consumption deteriorating tire pressure 12 is changed according to the vehicle speed.

Similarly, while the fuel consumption deteriorating tire pressure 12 is described as being changed according to the tire load rate, for example, the running inhibition tire pressure 11 may be changed, and the precise warning of the air pressure can be implemented if at least one of the running inhibition tire pressure 11 and the fuel consumption deteriorating tire pressure 12 is changed according to the tire load rate.

Note that it goes without saying that neither the running inhibition tire pressure 11 nor the fuel consumption deteriorating tire pressure 12 may be designed to be changed according to the vehicle speed or the like.

Figure 4:
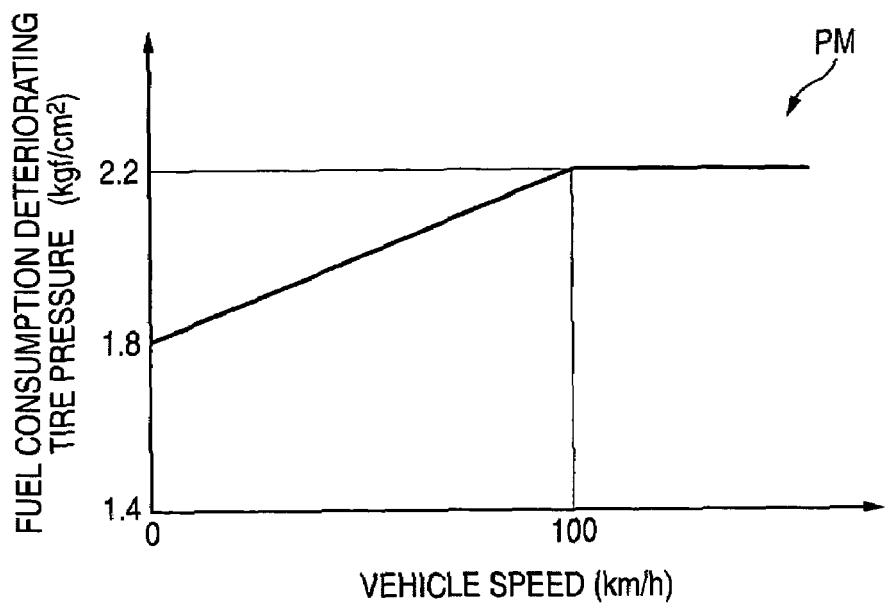
FIG. 4 is a drawing showing a modified example, which is the map showing the relationship between a vehicle speed and a fuel consumption deteriorating tire pressure.
Figure 5:
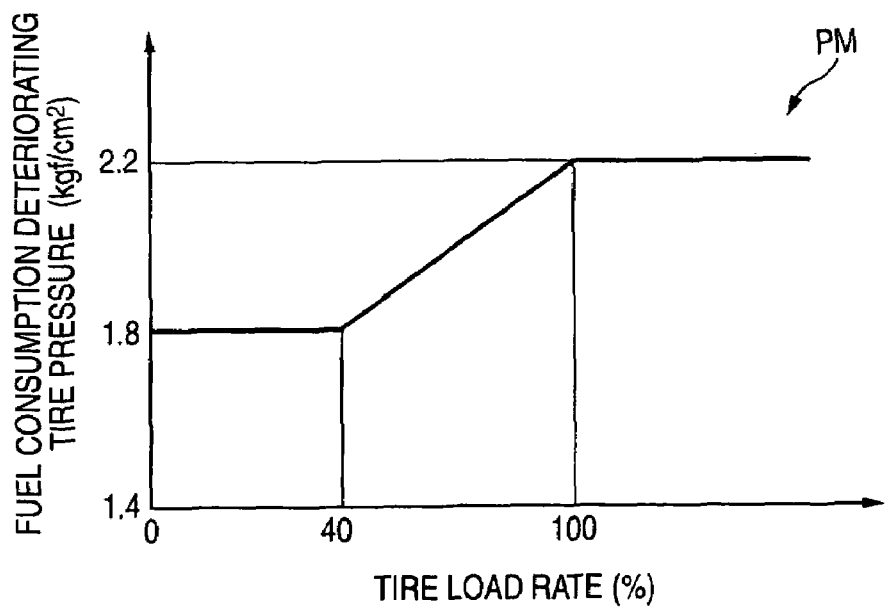
FIG. 5 is the drawing showing the modified example, which is the map showing the relationship between the tire load rate and fuel consumption deteriorating tire pressure.

In addition, while, in the embodiment, the fuel consumption deteriorating tire pressure 12 is described as being determined according to the vehicle speed and the tire load rate, for example, as shown in FIG. 4, the fuel consumption deteriorating tire pressure 12 may be designed to be determined by the vehicle speed only, or, as shown in FIG. 5, the fuel consumption deteriorating tire pressure 12 may be designed to be determined by the tire load rate only.

Additionally, while, in the embodiment, the tire pressure warning system 1 is described as being provided on the four-wheel automobile, the tire pressure warning system 1 may be provided on a two-wheel vehicle. Furthermore, the system may be provided on a railway vehicle in which rubber tires are mounted on wheels thereof. In addition, various modifications may, of course, be made to specific detailed structures of the system.

What is claimed is:

1. A tire pressure warning system comprising:
   an air pressure detecting unit for detecting an air pressure of each tire of a vehicle;
   a low pressure warning unit for warning an occupant that an air pressure is reduced when an air pressure detected by the air pressure detecting unit is lower than a running inhibition tire pressure set in advance; and
   a fuel consumption deterioration warning unit for warning the occupant of a deterioration in a fuel consumption when the air pressure is lower than a fuel consumption deteriorating tire pressure, wherein the fuel consumption deteriorating tire pressure is set higher than the running inhibition tire pressure.

2. The tire pressure warning system according to claim 1, further comprising:
   a vehicle speed detecting unit for detecting a vehicle speed; and
   a vehicle speed changing unit for changing at least one of the running inhibition tire pressure and the fuel consumption deteriorating tire pressure in accordance with the vehicle speed detected by the vehicle speed detecting unit.

3. The tire pressure warning system according to claim 1, further comprising:
   a load detecting unit for detecting a load of the tire relative to the surface of a road; and
   a load changing unit for changing at least one of the running inhibition tire pressure and the fuel consumption deteriorating tire pressure according to the load detected by the load detecting unit.

4. The tire pressure warning system according to claim 2, further comprising:
   a load detecting unit for detecting a load of the tire relative to the surface of a road; and
   a load changing unit for changing at least one of the running inhibition tire pressure and the fuel consumption deteriorating tire pressure according to the load detected by the load detecting unit.

* * * * *